United States Patent Office 2,933,180
Patented Apr. 19, 1960

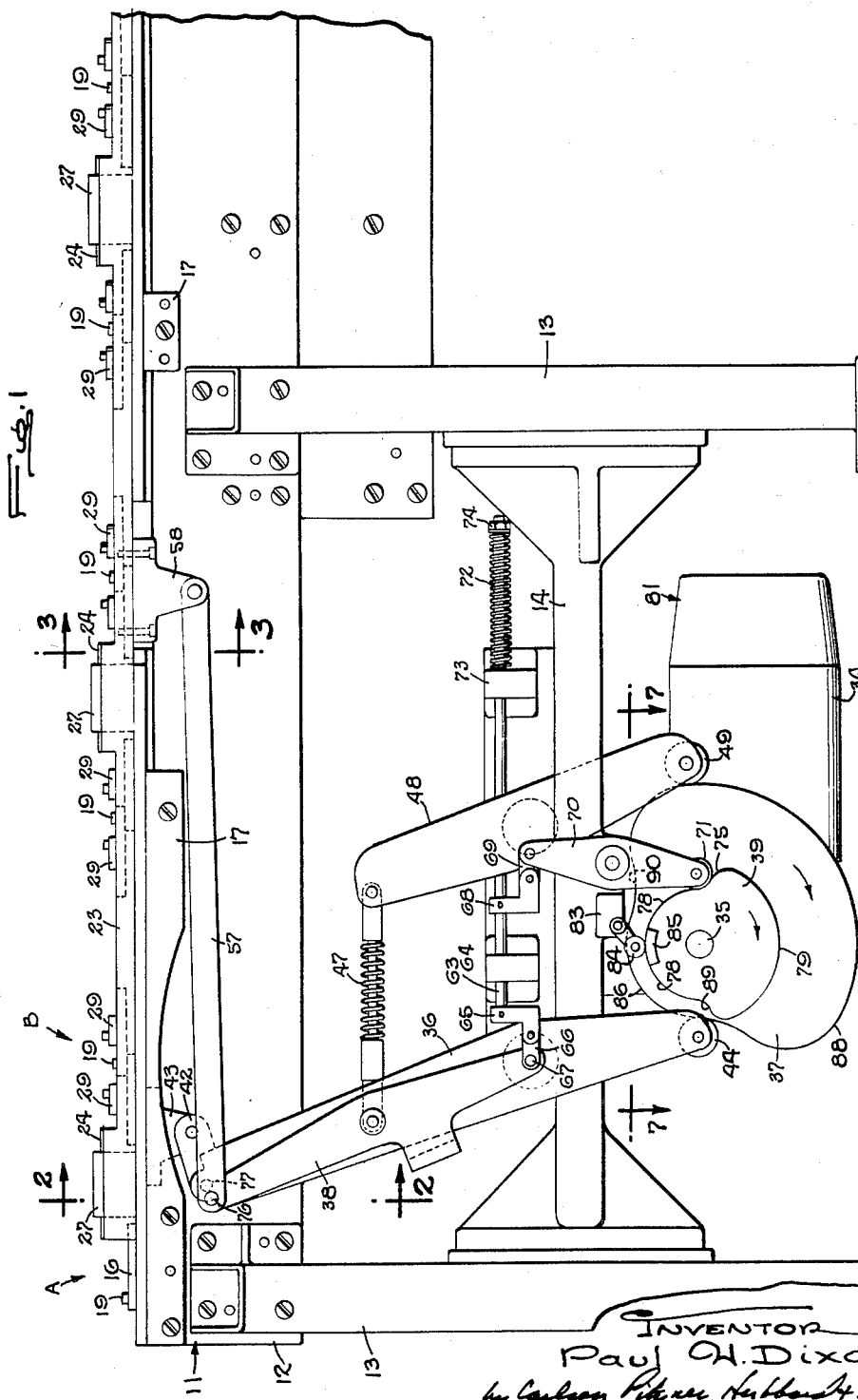

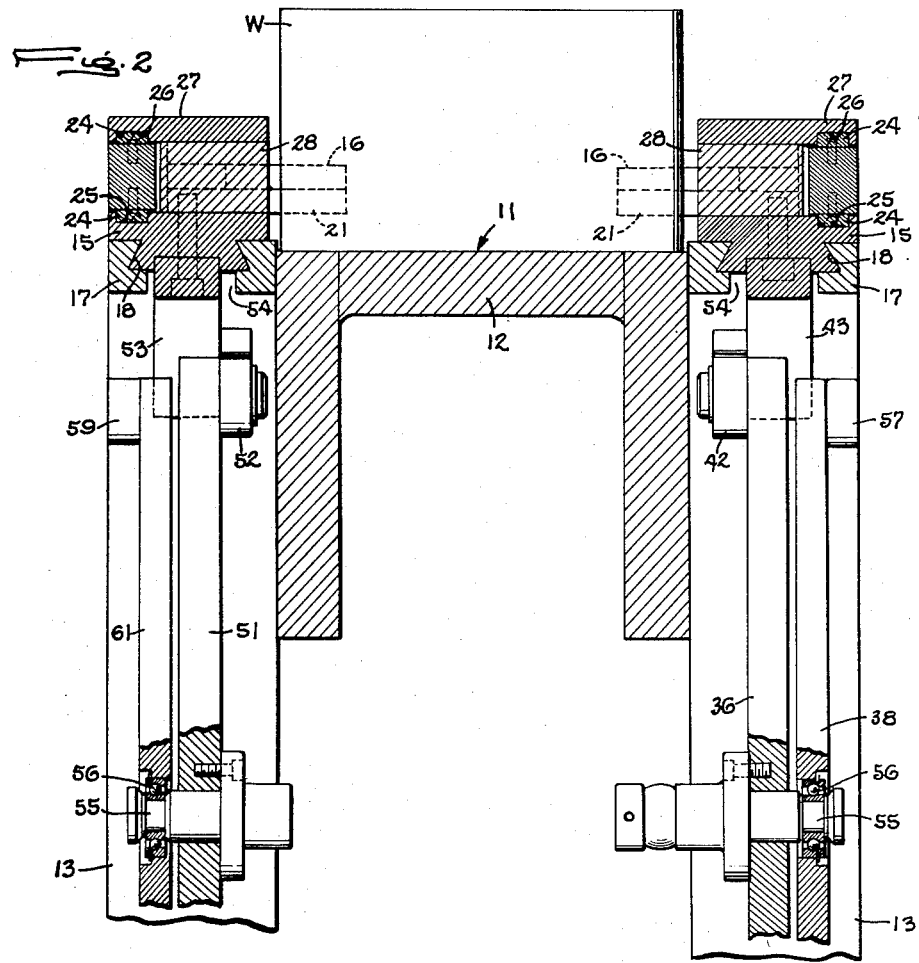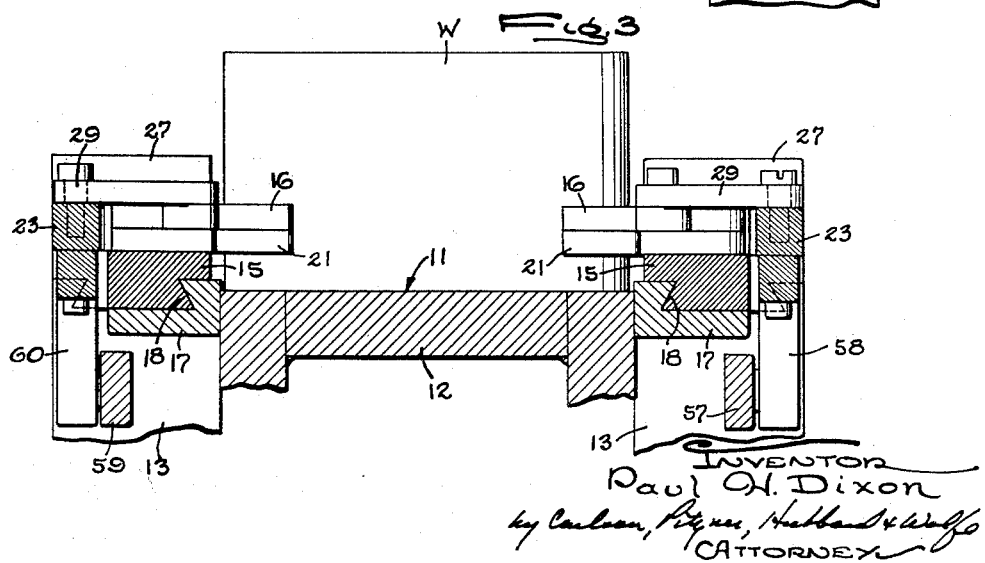

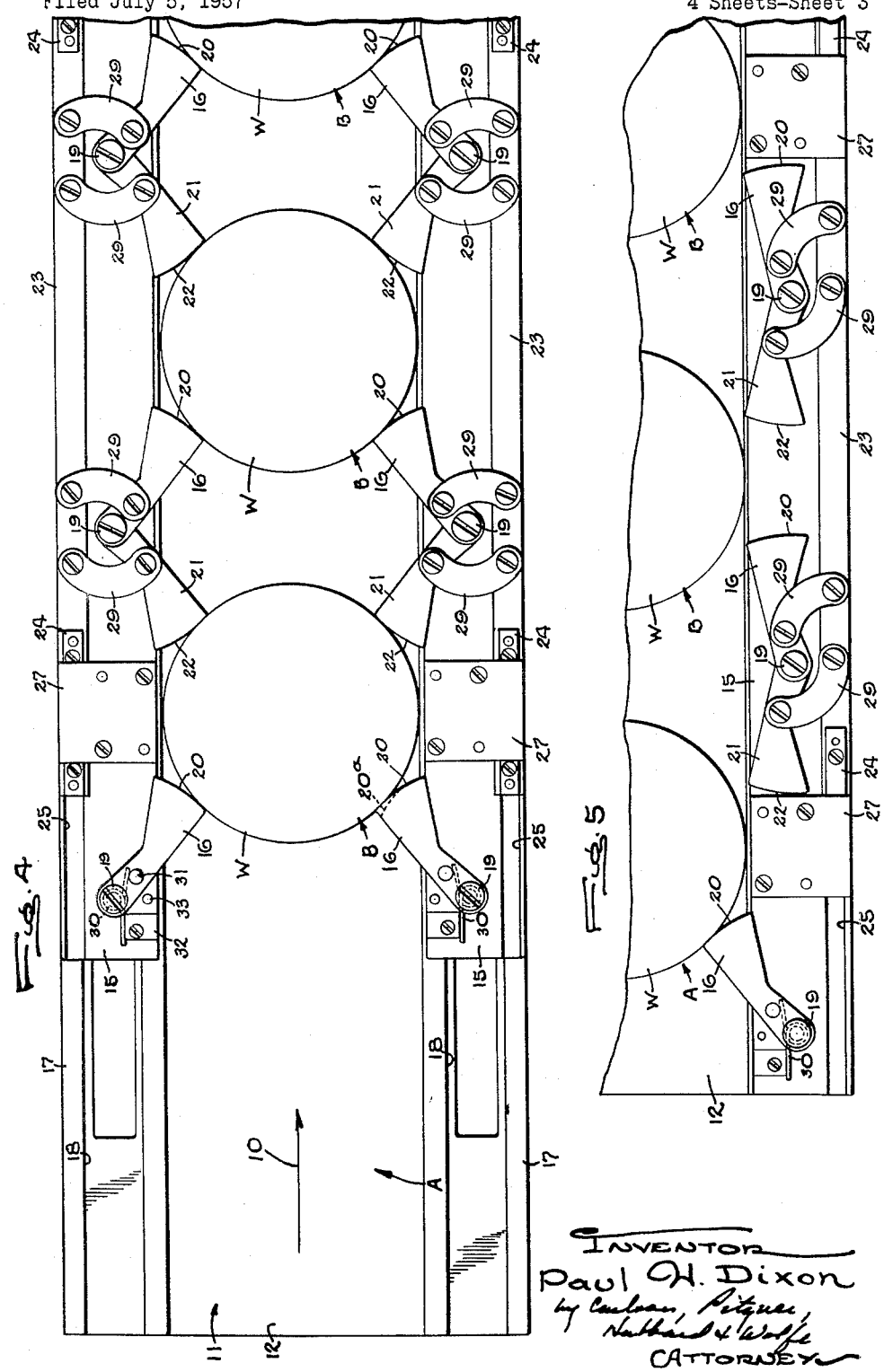

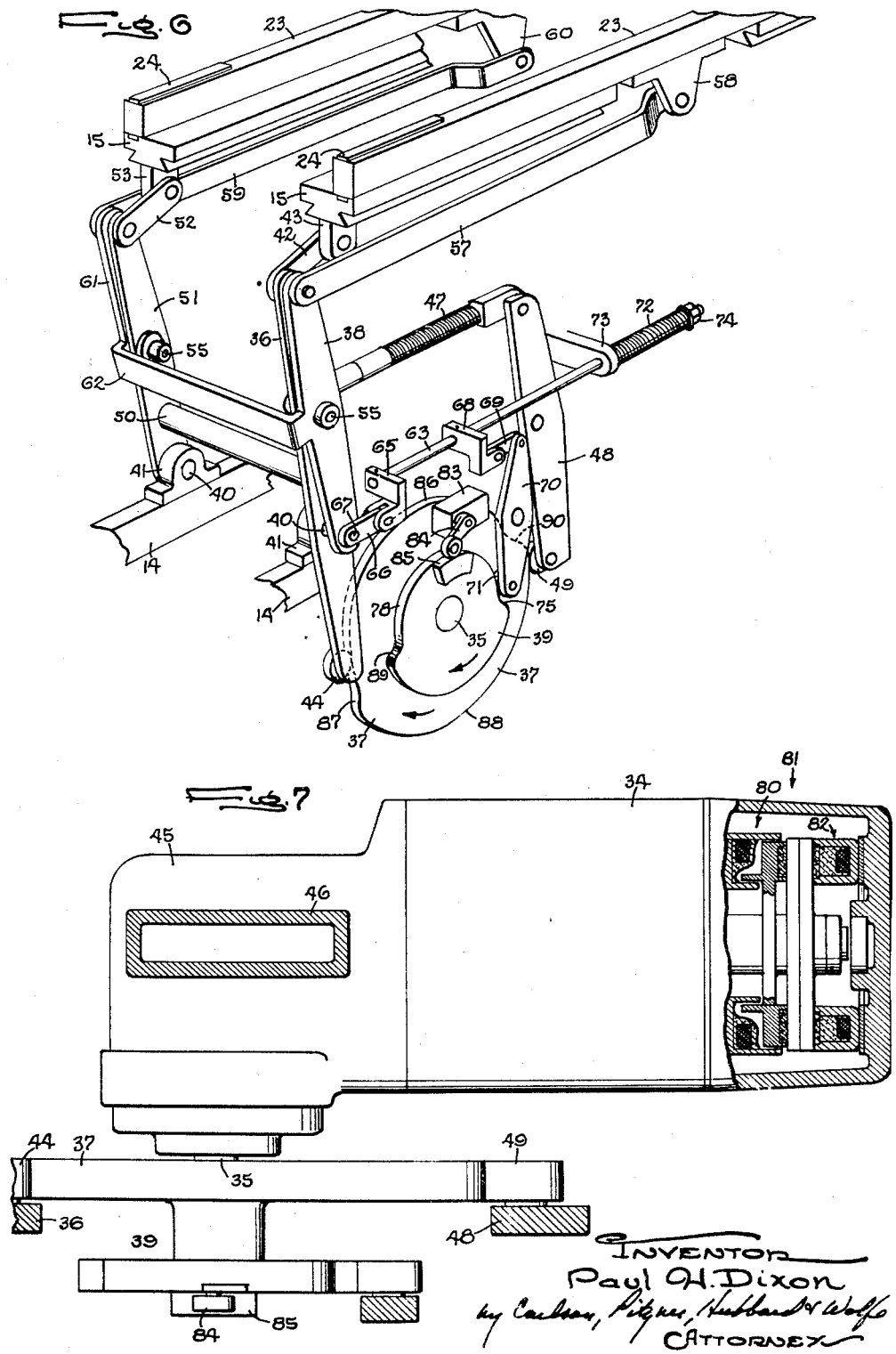

2,933,180

TRANSFER MECHANISM

Paul H. Dixon and Burns Darsie, Rockford, Ill., assignors to Dixon Automatic Tool, Inc., Rockford, Ill., a corporation of Illinois Application July 5, 1957, Serial No. 670,142

5 Claims. (Cl. 198—221)

This invention relates generally to mechanism for transferring a series of workpieces intermittently along a predetermined path. More particularly, the invention relates to transfer mechanism of the type comprising a plurality of pawls which first are shifted transversely of the workpiece path and into engagement with trailing surfaces of the workpieces, next are advanced along the path to shift the workpieces from one dwell position to the next, then are retracted to positions out of the path, and finally while in their retracted positions, are shifted reversely along the path and past the workpieces to the starting positions where they are advanced again into the path.

The general object of the invention is to provide novel transfer mechanism which is simple and inexpensive in construction, is easily adaptable to workpieces of different sizes and shapes, and is capable of advancing the workpieces rapidly from one dwell position to the next while still locating the workpieces accurately at the end of each advance.

Another object is to provide novel supporting and actuating mechanism for the pawls comprising two elongated members reciprocable endwise along the workpiece path and connected to the pawls for shifting the latter along the path as an incident to reciprocation of the members in unison and transversely of the path as an incident to relative endwise movements of the members.

A further object is to provide novel apparatus for utilizing motion derived from a single power actuator to reciprocate the supporting and actuating members in unison with and relative to each other in the proper sequence to effect a transfer operation.

Other objects and advantages of the invention will become apparent from the following detailed description taken in connection with the accompanying drawings, in which:

Figure 1 is a fragmentary side elevational view of transfer mechanism embodying the novel features of the present invention.

Figs. 2 and 3 are fragmentary sectional views taken along the lines 2—2 and 3—3 respectively of Fig. 1.

Figs. 4 and 5 are fragmentary plane views showing the parts of the transfer mechanism in different positions.

Fig. 6 is a fragmentary perspective view of the transfer mechanism including the slide actuating parts.

Fig. 7 is a fragmentary sectional view taken along the line 7—7 of Fig. 1, some of the parts being broken away and shown in section.

For purposes of illustration, the invention is shown in the drawings embodied in a mechanism for transferring a series of spaced workpieces W step by step along a straight path 10 and past suitable tools (not shown) which operate on the workpieces during their dwell periods. The path as indicated by an arrow in Fig. 4 extends along the top of a table 11 formed by an inverted horizontal channel 12 and spaced legs 13. The legs are secured rigidly to the channel and, intermediate their ends, are spanned by horizontal rails 14. While the workpieces may be of various sizes and shapes, they are shown as solid cylinders each having one of its flat ends resting on and slidable along the table. Each workpiece is placed on the table at a loading position A adjacent the left end of the table as viewed in Figs. 1, 4 and 5 and, from this position, is advanced intermittently to the right to successive spaced dwell positions B.

Generally, the improved transfer mechanism comprises a pair of horizontal supporting slides 15 (Figs. 1 to 6) mounted to reciprocate endwise along opposite sides of the workpiece path 10 and carrying spaced pawls or work engaging members 16 which are swingable into and out of the path. The pawls on each slide are alined transversely of the path with the respective pawls on the other slide to form pairs and are spaced apart equal distances corresponding to the desired spacing of the workpieces. When disposed in the path as shown in Fig. 4, the pawls engage trailing surfaces of the workpieces to shift the latter along the table as the slides move forwardly. After each advance of the workpieces, the pawls are shifted to retracted or inactive positions out of the path as shown in Fig. 5, so that they may move rearwardly past the workpieces during retraction of the slides.

The supporting slides 15 in this instance are elongated bars of generally rectangular cross section. Guiding the slides for endwise reciprocation are elongated blocks 17 (Figs. 1, 2, 3 and 6) which extend along and are bolted to the opposite sides of the channel 12 adjacent the upper edges thereof. The blocks provide upwardly opening recesses 18 which receive dovetailed undersides of the bars as shown in Figs. 2 and 3.

To simplify the mechanism for shifting the pawls 16 into and out of the workpiece path 10 and to avoid interference between the pawls and the tools which operate on the workpieces, each pawl is mounted on its supporting slide 15 to swing relative thereto in an arcuate path lying in a horizontal plane. Such swinging is obtained easily by forming the pawl as a flat elongated arm having one end portion journaled on a vertical pivot 19 which projects rigidly from the slide. The other or free end 20 of the pawl then is swingable horizontally between the retracted position above the slide and out of the workpiece path as shown in Fig. 5 and the advanced or active position in which the end of the pawl is disposed in the path and faces forwardly to engage the trailing surface of a workpiece as shown in Fig. 4.

In this instance where the workpieces W present rounded exterior contours to the pawls 16, the work engaging end 20 of each pawl is shaped to lie on a cylinder concentric with the pivot 19. The work engaging ends may be shaped differently for workpieces of other shapes. For example, with rectangular workpieces having slides paralleling the workpiece path 10, the leading corner of the work engaging end of each pawl may be relieved as indicated by a dotted line 20a in Fig. 4. This insures that the corner will pass behind the adjacent trailing corner of a workpiece as the pawl is advanced into the path.

When the advance of the pawls 16 along the workpiece path 10 stops, the workpieces W tend to slide ahead due to their inertia. To avoid such continued sliding and thereby enable the workpieces to be advanced rapidly and still be positioned accurately at the end of each advance, locating members or fingers 21 are mounted on the slides 15 to engage leading surfaces of the workpieces. These fingers hold the workpieces closely adjacent or in contact with the pawls and thus insure that the workpieces advance no farther than the pawls.

Like the pawls 16, the locating fingers 21 are moved into the workpiece path 10 to engage the workpieces during advance of the slides 15 and out of the path so that they may move past the workpieces during retraction of the slides. Also, the fingers are arranged in pairs each spaced forwardly along the slides from a different pair of pawls. The fingers of each pair are alined transversely of the path and provide rearwardly facing work engaging surfaces 22 which oppose the free ends 20 of the associated pair of pawls and cooperate therewith to define a work receiving pocket or recess. The size of this pocket as determined by the spacing of the work engaging surfaces of the pawls and fingers in their advanced positions is correlated with the size of the workpieces so as to reduce the permissible movement of the latter relative to the slides and still allow for some variation in the dimensions of successive workpieces.

The locating fingers 21 in this instance are of the same size and shape as the pawls 16 and are mounted on the slides 15 in a similar manner for swinging horizontally into and out of the workpiece path 10. To simplify the construction, the pivots 19 supporting the pawls of each work receiving pocket except the end pocket adjacent the loading station A also support the fingers of the next adjacent pocket forwardly along the path, the pawl lying above the finger on each pivot as shown in Figs. 2 to 5. The pawls of the end pocket adjacent the loading station and the fingers of the last pocket at the exit end of the path are journaled individually on separate pivots.

Shifting of the pawls 16 and the locating fingers 21 relative to the slides 15 and into and out of the workpiece path 10 is effected by forces applied along the path the same as the forces which are utilized to shift the slides back and forth. To this end, the pawls and fingers are connected to two elongated actuating parts 23 which extend along opposite sides of the path adjacent the respective slides and are mounted for endwise sliding relative to the slide. When the parts are shifted in one direction with respect to the slides, herein forwardly as shown in Fig. 5, the pawls and fingers are retracted out of the path. Shifting of the parts in the opposite direction to rearward positions relative to the slides as shown in Figs. 4 and 6 results in swinging of the pawls and fingers to their advanced positions in the workpiece path. When the actuating parts move along the path in unison with the slides, the pawls and fingers remain either in their advanced or retracted positions and also move in unison with the slides.

In the present instance, the actuating parts 23 (Figs. 1 to 5) are mounted directly on the tops of the slides 15 along the outer edges thereof beyond the pivots 19 for the pawls 16 and fingers 21. As shown in Figs. 2 and 5 each part is a bar of rectangular cross section having guide plates 24 bolted to its upper and lower sides. These plates are slidably received in an upwardly opening recess 25 extending along the top of the adjacent slide and a downwardly opening recess 26 formed in a plate 27 which is spaced above and secured to the slide by an intervening block 28 (Fig. 2).

To convert the relative endwise sliding of each actuating bar 23 and the adjacent supporting slide 15 to movement of the associated pawls 16 and fingers 21 transversely of the slide, a separate connection 29 (Figs. 1, 3, 4 and 5) is provided between the bar and each pawl and finger. The side by side arrangement of the bar and the slide and the pivotal mounting of the pawls and fingers make it possible to utilize a simple link as this connection. As shown in Figs. 4 and 5, opposite ends of this link are pivotally connected respectively to the bar and to the pawl or finger intermediate the ends of the latter. When the bar is retracted relative to the slide so that the pawls and fingers are advanced into the workpiece path 10 as shown in Fig. 4, the pivoted ends of each link are substantially alined crosswise of the path. With the bar advanced relative to the slide as shown in Fig. 5, the ends of the links pivoted on the bar also are advanced beyond the other ends so that the pawls and fingers are pulled outwardly to their retracted positions. To obtain clearance with respect to the pivots for the pawls and fingers, the links are curved outwardly along their lengths and away from the pivots.

No actuating links 29 are provided for the individually pivoted pawls 16 of the end work receiving pocket adjacent the loading station A. Each of these pawls normally is urged outwardly into the workpiece path 10 by a spring 30 encircling the supporting pivot 19 and acting at one end on a lug 31 depending from the pawl (Figs. 4 and 5). At its other end, the spring acts on a bracket 32 which projects upwardly from the adjacent supporting slide 15. Pins 33 upstanding from the slides engage the pawls to limit their inward swinging motion. The spring loading of these pawls enables a workpiece to be positioned at the loading station A by sliding the same forwardly along the end portion of the table, the pawls being cammed outwardly to their retracted positions by the workpiece as it is advanced and then springing inwardly to their advanced positions behind the workpiece after the latter has passed.

During the advance of workpieces W along the path 10, the actuating bars 23 are in their rearward positions on the supporting slides 15 so that the pawls 16 and fingers 21 are in their advanced positions as shown in Fig. 4. Also, the bars are advanced along the path in unison with the slides so that the pawls and fingers remain in their advanced positions. After the slides reach their advanced positions shown in Fig. 4, the bars are shifted to their forward positions on the slides to swing the pawls and fingers into their retracted positions out of the path as shown in Fig. 5. The slides then are retracted and the bars, while still in their forward positions on the slides, are moved substantially in unison therewith to retain the pawls and fingers out of the workpiece path. Finally, after the slides reach their retracted positions shown in Fig. 5, the bars are shifted rearwardly on the slides to project the pawls and fingers once again into the workpiece path in readiness for the next advance of workpieces. It will be seen that, for each workpiece advance, the slides and bars are reciprocated in a sequence during which the bars move first forwardly relative to the slides, next rearwardly in unison with the slides, and finally reversely relative to the slides and into their rearward starting positions.

The side by side movements of the slides 15 and the bars 23 facilitate the use of a single power actuator 34 (Figs. 1 and 7) for shifting these parts in the proper sequence to effect the transfer operation. This actuator rotates a shaft 35 whose motion is converted to reciprocating motions of the slides and bars by two separate actuating mechanisms, one for the slides and the other for the bars. The mechanism for the slides comprises a lever 36 which is swung back and forth by a cam 37 on the shaft and is connected to the slides to shift the latter endwise during its oscillations. The bar mechanism similarly comprises a lever 38 which is connected to the bars to reciprocate the same as the lever is swung back and forth by another cam 39 fast on the same shaft. To obtain the desired sequence of slide and bar movements, the shapes of the cams are correlated with each other so that the bars are advanced and retracted substantially in unison with the slides and are shifted relative thereto while the slides are stationary in their advanced and retracted position.

In the present instance, the lever 36 and the cam 37 for the slides 15 are mounted beneath the workpiece path 10 for movement in the plane of the slide on one side of the path. The mounting for the lever comprises a shaft 40 (Fig. 6) projecting rigidly from an intermediate portion of the lever and journaled in a bearing 41 on one of the frame rails 14.

The lever is disposed vertically and the motion of its upper end is transmitted to the adjacent slide by a horizontal link 42. The latter is pivotally connected at opposite ends to the lever and to a lug 43 depending rigidly from the slide and through a recess in the adjacent guide block 17 (Figs. 2 and 4). Adjacent its lower end, the lever 36 carries a follower roller 44 engageable with the periphery of the cam.

The cam 37 for the slides 15 is of the open face type and its shaft 35 is journaled in a housing 45 (Fig. 7). The latter is secured to the frame rail by a bracket 46 to support the shaft for rotation about a horizontal axis paralleling the lever fulcrum defined by the bearing 41. The follower roller 44 on the slide lever 36 is maintained yieldably in contact with the cam by the spring 47 acting in compression between the lever and the upper end of another lever 48. The other lever is fulcrumed on the adjacent frame rail 14 and carries another follower roller 49 which engages the side of the cam opposite the first roller.

The other slide 15 on the side of the workpiece path 10 opposite the slide lever 36 is connected to the lever for movement of the slides in unison. This connection includes a rigid torsion tube 50 (Fig. 6) having one end welded to the lever above its fulcrum and its other end welded to an intermediate portion of an upstanding lever arm 51.

The latter is pivotally supported at its lower end on the other frame rail 14 for rotation about the axis of the lever and, at its upper end, is connected by a link 52 to a lug 53 depending from the other slide. The adjacent guide blocks 17 are slotted as indicated at 54 (Fig. 4) to receive the lug.

For a purpose to appear later, the lever 38 for the actuating bars 23 is fulcrumed directly on the lever 36 for the supporting slides 15. Herein, the fulcrum for the bar lever is defined by a stub shaft 55 (Figs. 2 and 6) projecting rigidly from the slide lever between the fulcrum and the upper end thereof and journaled in bearings 56 intermediate the ends of the bar lever. Swinging of the upper end of the bar lever is transmitted to the bar on the adjacent side of the workpiece path 10 by an elongated horizontal link 57 which is pivotally connected at opposite ends to the lever and to a lug 58 depending from the bar and through a slot in the adjacent slide 15. To reciprocate the other bar in unison with the first one, a similar link 59 (Fig. 6) connects a lug 60 on the other bar to the upper end of a lever arm 61. The latter is connected to the bar lever by an integral crosspiece 62 (Figs. 1 and 6) and is fulcrumed on the slide lever arm 51 to swing about the axis of the stub shaft 55 which defines the fulcrum for the bar lever.

To transmit motion derived from the cam 39 for the bars 23 to the bar lever 38, one end of a rod 63 slidable in a guide 64 on the adjacent frame rail 14 (Fig. 1) is connected by a bracket 65 and a link 66 to a pivot 67 on the lower end portion of the bar lever. Another bracket 68 and link 69 connect an intermediate portion of the rod to the upper end of an upright lever 70. This lever is fulcrumed intermediate its ends on the rail and, at its lower end, carries a follower roller 71 which engages the cam. The latter is also of the open face type and is secured to the camshaft 35 adjacent the cam 37 for the slides 15 (Figs. 1, 6 and 7). At its other end, the rod is encircled by a spring 72 which acts in compression between a bar 73 rigid with the frame and a nut 74 on the rod. This spring yieldably urges the rod in the proper direction to maintain the follower in contact with the cam.

The direction in which the spring 72 urges the rod 63 for the bar lever 38 is the same as that in which the actuating bars 23 are shifted rearwardly relative to the supporting slides 15 to advance the pawls 16 and fingers 21 into the workpiece path 10 as shown in Fig. 4. Thus, the force of the spring actually advances the pawls and fingers relative to the slides 15 when the follower 71 for the bar lever engages a fall 75 on the cam 39. Since this force is yieldable, the transfer mechanism will not jam in the event that any of the workpieces W is displaced on the table 11 far enough to block advance of any pawl or finger.

The purpose of fulcruming the bar lever 38 and the associated lever arm 61 on the slide lever 36 and its lever arm 51 is to simplify the cam 39 for the actuating bars 23 while insuring that the bars 23 and thus the pawls 16 and the fingers 21 move in unison with the supporting slides 15 during advance of the latter along the workpiece path 10. In furtherance of this purpose, pivotal connections 76 (Figs. 1 and 6) between the links 57 and 59 and the upper ends of the bar lever and its lever arm are located so that they are alined approximately with corresponding connections 77 between the links 42 and 52 and the upper ends of the slide lever and its arm when the pivot 67 at the lower end of the bar lever is alined with the fulcrum for the slide lever as shown in Figs. 1 and 7. Such alinement of the pivot and the fulcrum is obtained simply by shaping that part of the bar cam 39 engaged by the follower roller 71 during advance of the slides as a dwell surface 78 of uniform radius. So long as the follower engages this surface, the pivot 67 remains in alinement with the fulcrum of the slide lever and the upper ends of the two levers and their arms move in unison about the fulcrum. The pivoted connections 76 and 77 on these ends being in substantial alinement at this time, the slides and the bars also move in unison.

On the return stroke of the supporting slides 15 when the actuating bars 23 are in their advanced positions to retract the pawls 16 and the fingers 23 out of the workpiece path 10 the follower roller 71 rides a higher dwell surface 79 on the cam 39 and the pivot 67 at the lower end of the bar lever 38 is spaced a short distance from the fulcrum of the slide lever 36. Also, the connections 76 at the upper ends of the bar lever and its arm 61 are spaced from the connections 77 at the upper ends of the slide lever and its arm 51. Although this results in some movement of the bars relative to the slides when the higher dwell surface is of uniform radius, the slight movement of the bars and the corresponding movement of the pawls and fingers relative to the slides is immaterial because the pawls and fingers are disposed out of the path and are not engaging the workpieces. The higher dwell surface 79 therefore is also made of uniform radius.

The cams 37 and 39 preferably are shaped to shift the slides 15 and the bars 23 through one transfer cycle during rotation of the cam shaft 35 through a complete revolution. The single power actuator 34 for effecting herein is an electric motor supported on the housing 45 (Fig. 7) and driving the shaft through a clutch 80 and reduction gear mechanism within the housing. The clutch is part of an electromagnetic friction clutch-brake unit 81 which, upon energization of the clutch, couples the motor to the camshaft and, upon energization of a brake 82, applies a retarding torque to the shaft. The direction of rotation of the camshaft by the motor is clockwise as indicated by arrows in Figs. 1 and 6. Through suitable control circuits (not shown) including a switch 83 (Figs. 1 and 6) mounted for engagement of its actuator 84 by a projection 85 on the cam 39 for the bars 23, the clutch and brake are energized selectively in a well known manner to rotate the shaft through a complete revolution from its starting position of Figs. 1 and 6 and then stop the shaft. Initiation of such rotation may be effected as desired, for example, manually or automatically in response to movement of some part such as the tools which operate on the workpieces.

In the starting position of the camshaft 35, the follower 44 for the slide lever 36 engages a lower dwell surface 86 of the cam 37 adjacent a rise 87 and the supporting slides 15 are in their retracted positions with respect to the table 11 as shown in Figs. 1, 5 and 6. Also, the follower 71 for the bar lever 38 is riding on the lower dwell surface 78 adjacent the fall 75 on the cam 39 so that the actuating bars 23 are retracted with respect to the slides as shown in Figs. 1, 4 and 6 to project the pawls 16 and fingers 21 into the workpiece path 10 as shown in Fig. 4. With the parts in these positions, a workpiece W may be positioned in the pocket defined by the end pawls and fingers at the loading station A simply by sliding the workpiece inwardly from the end of the table 11 past the pawls and into engagement with the fingers. The pawls then swing into the path and behind the workpiece after the latter has passed for enough to abut the fingers.

In operation of the transfer mechanism as the camshaft 35 rotates from the starting position of Fig. 1, the follower 44 for the slide lever 36 rides up the rise 87 of the cam 37 and onto an upper dwell surface 88 to shift the supporting slides 15 into their advanced positions because, during the slide advance, the follower 71 for the bars rolls along the lower dwell surface 78 of the cam 39 to maintain the pivot 67 at the lower end of the bar lever 38 in axial alinement with the fulcrum of the slide lever. With the pawls and fingers thus fixed relative to the supporting slides and engaging both leading and training surfaces of the workpieces, the latter are located accurately at the end of the advancing movement even though their advance is rapid.

The followers 44 and 71 continue to ride the dwell surfaces 88 and 78 after the supporting slides 15 reach their advanced positions and until the follower 71 for the bars reaches a rise 89 on the associated cam 39. During this time, the workpieces W may be operated on by the tools located at the dwell positions. Shifting of the follower 71 by the rise 89 results in swinging of the bar lever 38 in a clockwise direction about its fulcrum and advance of the actuating bars 23 to the right with respect to the slides as shown in Fig. 5. In these positions of the bars, all of the pawls are retracted out of the workpiece path 10. This shift of the actuating bars occurs while the follower for the slides is still engaging its higher dwell surface 88 and before it reaches a fall 90 (Fig. 1).

When the follower 44 for the slides 15 rides down the fall 90 on the cam 37, the slide lever 36 swings counterclockwise as viewed in Fig. 1 to return the slides to their retracted positions. The actuating bars are retracted substantially in unison with the slides because, at this time, the follower 71 engages the higher dwell surface 79 of the cam 39. If a workpiece has been placed on the table 11 at the loading position A prior to retraction of the slides, the spring urged end pawls will be cammed outwardly upon engagement with the workpiece and then will swing inwardly after passing behind the workpiece.

After the supporting slides 15 are retracted and while the follower 44 therefor engages its lower dwell surface 86, the follower 71 for the bars 23 reaches the fall 75 and the bars are retracted relative to the slides by the spring 72 to project the pawls 16 and fingers 21 back into the workpiece path 10. As the pawls and fingers swing outwardly, their curved ends 20 and 22 engage and tend to center in the path any workpiece which has become displaced slightly since the preceding advancing movement. When the follower 71 for the bars reaches the lower dwell surface 78 of the cam 39, the camshaft 35 will have completed one revolution and the parts are in their starting positions ready for another transfer cycle.

In the event that any workpiece W is oversized or has been displaced far enough to block the advance of any of the pawls 16 and fingers 21 into the workpiece path 10, all of the pawls and fingers are stopped short of their advanced positions by the same amount. This is because, due to their connection to each other through the actuating bars 23 and the links 29, they are constrained to move equal distances although in different paths. The premature stopping of the pawls and fingers may take place without damage to the transfer mechanism since the bars are retracted to advance the pawls and fingers under the yieldable force of the spring 72. To avoid substantial displacement of the workpieces transversely of the path, suitable guides may be extended along opposite sides of the path at a lateral spacing slightly greater than the diameter of the workpieces. Herein, the guide blocks 17 for the slides 15 extend above the top of the table 11 a short distance as shown in Fig. 2 to provide such guides. Also, the slides themselves guide the workpieces in the spaces intervening between the blocks.

It will be apparent that the improved transfer mechanism described above is capable of advancing workpieces W quickly along the path 10 and locating the same accurately at the end of each indexing movement. With the actuating bars 23 reciprocable alongside the slides 15 and connected to the pawls 16 and fingers 21 for shifting these parts transversely of the path by forces applied along the path the same as the forces for shifting the slides, all of these forces may be derived from a single power actuator, herein the motor 34, and may be applied easily to the bars and slides through separate motion converting connections. By fulcruming the lever 38 for the bars directly on the slide lever 36 and locating the pivotal connections 76 and 67 at opposite ends of the bar lever in substantial alinement with the pivotal connection 77 and fulcrum for the slide lever, the dwell surfaces 78 and 79 on the came 39 for the bars may be of uniform curvature to effect advance and retraction of the pawls and fingers in union with the slides.

We claim as our invention:

1. In a mechanism for advancing workpieces intermittently along a predetermined path, the combination of, a first elongated bar and a first elongated slide extending along one side of said path and mounted for endwise reciprocation relative to each other, a second elongated bar and a second elongated slide extending along the opposite side of said path and mounted for endwise reciprocation relative to each other, a plurality of transfer pawls pivotally connected to said slides at spaced points along the slide for movement transversely of the slides and into and out of said path and each alined transversely of the path with a corresponding pawl on the other side of the path to form a pair, each of said pawls providing a work engaging surface facing forwardly along said path to engage a trailing surface of a workpiece in the path, a plurality of locating fingers pivotally connected to said slides at spaced points for swinging into and out of said path and arranged in pairs each spaced forwardly along the path from a different pair of said pawls and providing rearwardly facing surfaces engageable with leading surfaces of a workpiece engaged by the associated pawls, a plurality of links each pivotally connected to a different one of said pawls and fingers and to adjacent one of said bars for swinging of the pawls and fingers transversely of the bars and into and out of said path as an incident to shifting of the bars endwise relative to said slides, a first actuating mechanism connected to said slides and operating to shift the same endwise in unison with each other, and a second actuating mechanism connected to said bars for shifting the same endwise in unison with each other and selectively in unison with and relative to said slides.

2. In a mechanism for advancing workpieces intermittently along a predetermined path, the combination of, a first elongated bar and a first elongated slide extending along one side of said path and mounted for endwise reciprocation relative to each other, a second elongated bar and a second elongated slide extending along the opposite side of said path and mounted for endwise reciprocation relative to each other, a plurality to transfer pawls pivotally connected to said slides at spaced points along the slide for movement transversely of the slides and into and out of said path and each alined transversely of the path with a corresponding pawl on the other side of the path to form a pair, each of said pawls providing a work engaging surface facing forwardly along said path to engage a trailing surface of a workpiece in the path, a plurality of locating fingers pivotally connected to said slides at spaced points for swinging into and out of said path and arranged in pairs each spaced forwardly along the path from a different pair of said pawls and providing rearwardly facing surfaces engageable with leading surfaces of a workpiece engaged by the associated pawls, each of said pawls and fingers having a connection with the adjacent one of said bars for swinging of the pawls and fingers transversely of the bars and into and out of said path as an incident to shifting of the bars endwise relative to said slides, a first actuating mechanism connected to said slides and operating to shift the same endwise in unison with each other, and a second actuating mechanism connected to said bars for shifting the same endwise in unison with each other and selectively in unison with and relative to said slides.

3. In a mechanism for advancing workpieces intermittently along a predetermined path, the combination of, a frame, first and second elongated elements disposed side by side and mounted on said frame for endwise reciprocation longitudinally of said path in unison with and relative to each other, a transfer member mounted on one of said elements and connected to the other element for movement back and forth transversely of and into and out of the path as an incident to endwise reciprocation of the elements relative to each other, a first operating lever fulcrumed on said frame and connected to said first element for endwise reciprocation of the element during shifting of the lever back and forth, a first actuating mechanism for shifting said lever back and forth, a second operating lever fulcrumed on said first lever at a point spaced from the fulcrum of the first lever and connected to said second element for shifting the latter endwise relative to the first element as an incident to swinging of the second lever relative to the first lever, and a second actuating mechanism for shifting said second lever relative to said first lever, said second lever and said second mechanism having a pivotal connection transmitting motion from the mechanism to the lever and movable into and out of a position of axial alinement with said fulcrum of said first lever.

4. In a mechanism for advancing workpieces intermittently along a predetermined path, the combination of, a frame, first and second elongated elements disposed side by side and mounted on said frame for endwise reciprocation longitudinally of said path relative to each other, a transfer member mounted on one of said elements and connected to the other element for movement back and forth transversely of the elements and into and out of the path as an incident to endwise reciprocation of the elements relative to each other, a first operating lever fulcrumed on said frame and connected to said first element for endwise reciprocation of the element during shifting of the lever back and forth, a first actuating mechanism for shifting said lever back and forth, a second operating lever fulcrumed on said first lever and connected to said second element for shifting the latter endwise relative to the first element as an incident to swinging of the second lever relative to the first lever and for shifting the second element in unison with the first element as an incident to swinging of the first lever while the second lever is stationary relative thereto, and a separate actuating mechanism connected to said second lever and operated in timed relation to said first mechanism selectively to shift the second lever relative to said first lever and to hold the second lever stationary with respect to the first lever.

5. In a mechanism for advancing workpieces intermittently along a predetermined path, the combination of, a pair of elongated supporting elements disposed side by side and supported for endwise reciprocation longitudinally of said path relative to each other, a transfer member mounted on a first one of said elements for movement back and forth transversely of the elements and into and out of the path, a connection between said member and the other of said elements operable to shift the member back and forth transversely of the path as an incident to shifting of the elements back and forth endwise relative to each other, and actuating mechanism for shifting said elements selectively in unison with and relative to each other in a sequence to project said transfer member into said path during movement of said first element in a forward direction along the path and to maintain the member in a retracted position out of the path when the first element is shifted in the opposite direction, said actuating mechanism comprising a single rotary camshaft, two separate cams thereon one for said first element and the other for said other element, two followers, one engaging each of said cams, and individual couplings connecting said followers to said supporting elements whereby each of said cams controls the movement of one of said elements.

References Cited in the file of this patent

UNITED STATES PATENTS

| | | |
|---|---|---|
| 1,426,039 | Candee | Aug. 15, 1922 |
| 1,435,046 | Birnstock | Nov. 7, 1922 |
| 1,779,683 | Strandt et al. | Oct. 28, 1930 |